Feb. 2, 1965  A. F. STEWART  3,168,277
REAR VIEW MIRROR
Filed Dec. 30, 1963  2 Sheets-Sheet 1
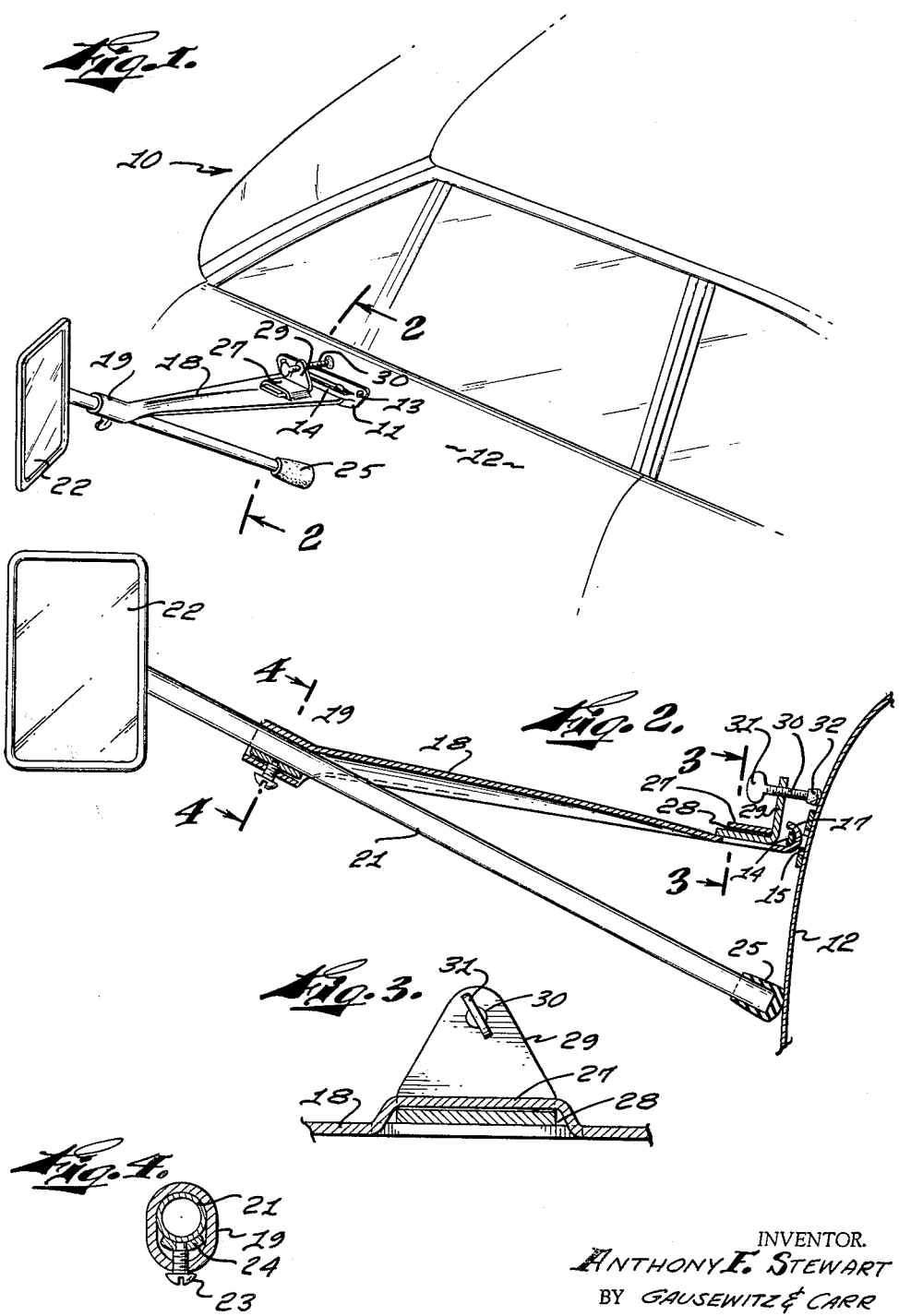
INVENTOR.
ANTHONY F. STEWART
BY GAUSEWITZ & CARR
ATTORNEYS

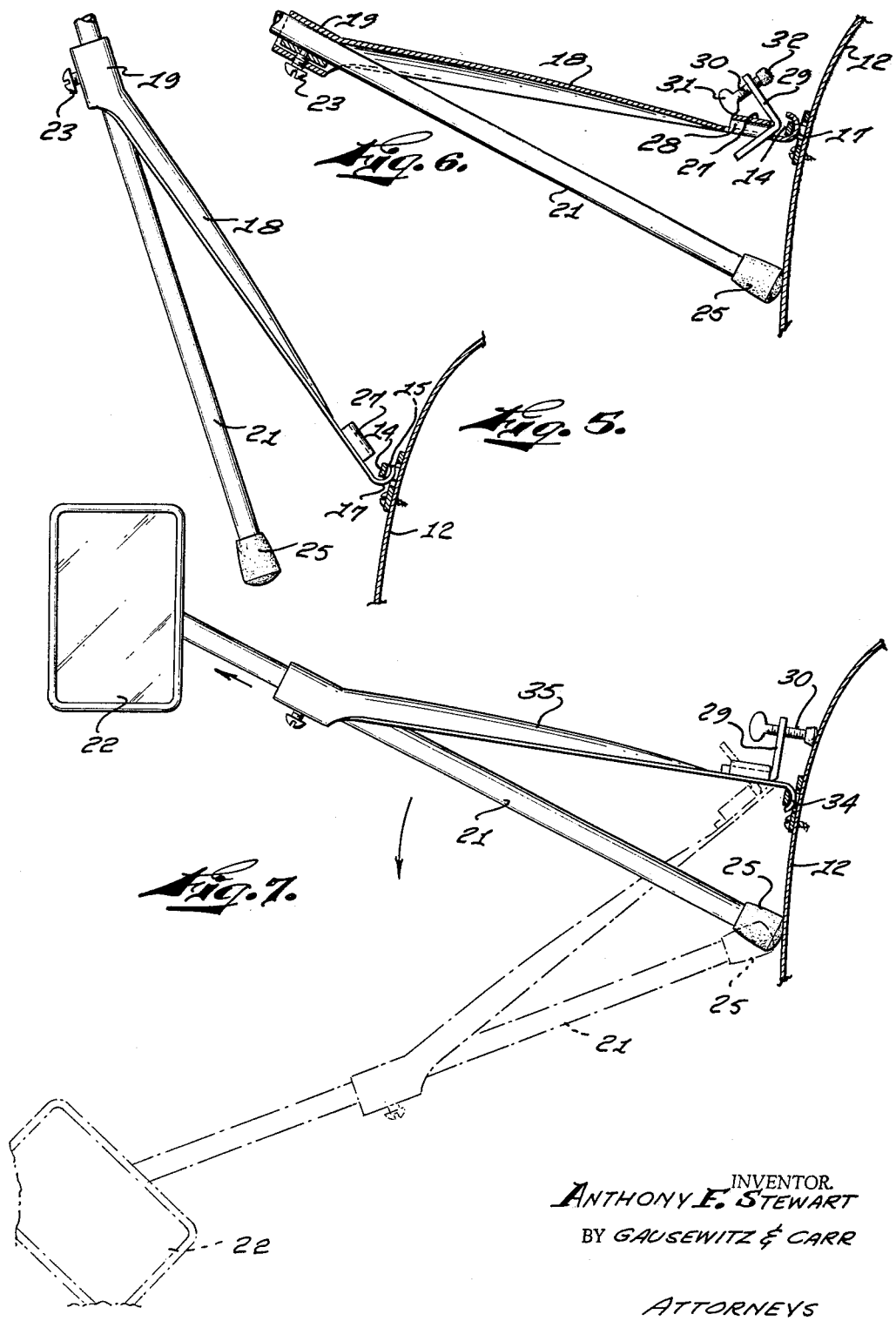

United States Patent Office 3,168,277
Patented Feb. 2, 1965

3,168,277
REAR VIEW MIRROR
Anthony F. Stewart, 12091 Nieta Drive,
Garden Grove, Calif.
Filed Dec. 30, 1963, Ser. No. 334,092
9 Claims. (Cl. 248—225)

This invention pertains to a rear view mirror primarily intended for vehicles.

The arrangement of this invention is particularly adapted for the vehicles towing trailers, or which have some other obstruction to the driver's rearward vision. The width of a house trailer, for example, requires that a mirror project outwardly considerably beyond the amount of the conventional outside rear view mirror. As a result, there have been several proposals for rear view mirrors on long extensions which are attachable to the side of a vehicle. There has been difficulty, however, in obtaining a mirror support having the required rigidity. In other words, the vibrations from the movement of the vehicle applied through the long lever arm supporting the mirror, together with any additional movement allowed by the mirror mounting arrangement, can result in an inability to see clearly to the rear. Most prior mirror supports of the general type of this invention relay upon gravity to hold the supporting element against the side of the vehicle. Obviously, when the vehicle strikes bumps the mirror may move upwardly as the gravitational pull is overcome. Makeshift arrangements to increase the weight of the mirror have been customary, but this has been imperfect in results and has left the basic problem unsolved.

The present invention provides a design by which the mirror can extend outwardly a considerable distance from the vehicle's side, yet which is of rigid construction so that the mirror is firmly retained and quite easily viewed. This is accomplished through the provision of a plate that is attached to the side of the vehicle and through which is hooked a supporting link. The outer end of this link telescopes with a post that at its distal end carries the mirror. The bottom end of the post rests against the side of the vehicle beneath the supporting link. Inwardly adjacent the bracket is an adjustable unit carried by the supporting link which extends beyond the supporting link on the upper side. This unit includes a screw that engages the side of the vehicle above the bracket and prevents upward movement of the mirror assembly. Hence, the mirror is rigidly held above and below.

It is an object of this invention to provide an improved mounting for an external rear view mirror for vehicles.

Another object of this invention is to provide a rear vew mirror mounting which is rigid and free from vibrations and movement during operation of the vehicle to which it is attached.

A further object of this invention is to provide a rear view mirror mounting of simplified and economical construction, yet of durable nature.

An additional object of this invention is to provide a rear view mirror mounting which precludes damage to the vehicle to which it is attached.

These and other objects will become apparent from the following detailed description taken in connection with the accompanying drawing in which:

FIGURE 1 is a perspective view of the mirror arrangement of this invention as attached to the side of a vehicle;

FIGURE 2 is a sectional view of the mirror taken along line 2—2 of FIGURE 1;

FIGURE 3 is an enlarged fragmentary transverse sectional view of the bracket portion of the mirror taken along line 3—3 of FIGURE 2;

FIGURE 4 is an enlarged transverse sectional view of the telescoping arrangement between the two principal links taken along line 4—4 of FIGURE 2;

FIGURE 5 is a fragmentary side elevational view illustrating the manner in which the support link is hooked into position;

FIGURE 6 is a fragmentary side elevational view, partially in section, showing how the upper brace is installed; and FIGURE 7 is a side elevational view of a modified form of the invention in which the hook faces downwardly instead of up.

With reference to the drawing, the device of this invention may be seen in FIGURES 1, 2 and the other views as attached to the side of a passenger car 10. The mirror assembly includes a small plate 11 which is attached to the left-hand door 12 of the vehicle 10 by screws 13. It could be secured as well to some other portion of the vehicle. The plate 11 is slit longitudinally along two parallel lines with a small section 14 being bent outwardly at that location. This provides an elongated slot 15 outwardly of the plate 11.

Fitted within the slot 15 is the rounded hook end 17 of a link 18. This link may be of sheet metal construction, being flat adjacent the bracket and terminating in a short tubular end portion 19. The axis of the latter section is bent upwardly with respect to the longitudinal axis of the main portion of the link 18.

The cylindrical end 19 slidably receives a tubular post 21 that at its outer end carries a mirror 22. The connection to the mirror may be by an appropriate universal joint or other adjustable connection such as is well-known in the art. The position of the cylindrical end 19 along the length of the post 21 is determined by first sliding the two parts to the desired location and then tightening the set screw 23 which threadably passes through the periphery of the end portion 19. The inner end of screw 23 bears against a pressure plate 24 which, in turn, engages the periphery of the tube 21.

The bottom end of the tube 21 is provided with a resilient bumper 25 which rests against the car door 12. Hence, the bumper 25 limits the inward movement of the post 21 and contacts the door without scratching or damaging it.

The end of the link 18 adjacent the hook end 17 is slit and bent upwardly at a transverse offset portion 27 to define a slot 28 above the main portion of the link. Through this slot there extends the base portion of a bracket 29, which is substantially L-shaped in cross section. The upper end of this bracket threadably receives a screw 30, which has a flat readily rotated head 31. The inner end of the screw 30 is provided with a resilient bumper element 32 which contacts the car door 12 above the plate 11.

This construction possesses a considerable advantage in providing a projecting side rear view mirror. Obviously, the telescoping connection between the link 18 and the post 21 permits the mirror 22 to be positioned at the precisely desired altitude. Also, it can be seen that the parts are of economical construction, although at the same time they are of durable nature. One of the principal benefits from this construction is the use of the screw 30 above the plate 11 where the inner end of the link 18 connects. The screw 30 is rotated until the bumper 32 contacts the car door as the mirror is in its installed position. As a consequence of this, the mirror cannot move upwardly about the hook 17, being precluded by the inner end of the screw 30 and the moment arm afforded by the bracket 29. Of course, downward movement is limited by the bumper end 25 of the post 21. Hence, the mirror is rigidly positioned against both upward and downward movement about the rounded hook end 17 of the link 18. The result is a rigid installation, which will not vibrate and distort the vision of the driver. Moreover, the inner end of the post 21 will not rise away from the car door, but is held in firm contact with the door despite the movement of the vehicle to which it is attached. This means that the inner end of the post 21 will never damage the vehicle by being violently driven against it, because it is held in positive contact with the door without reliance on gravity alone.

Installation of the mirror is quite simple, being accomplished in the manner shown in FIGURES 5 and 6. The hook end 17 is inserted upwardly through the opening 15 at the offset 14 of the plate 11, as shown in FIGURE 5, and prior to the association of the bracket 29 with the link 18. The hook end is fitted through the opening 15 and the link is allowed to drop down to the position where the inner end of the post 21 contacts the side of the car. The position of the telescoping end 19 of the link 18 may be adjusted along the post 21 at this time to give the mirror a proper vertical position. Then the bracket 29 is inserted through the opening 28 by being rotated as shown in FIGURE 6, and the screw 30 is tightened to bring the bumper 32 into firm contact with the car. Consequently, the link 18 and post 21 cannot move upwardly because of the contact between the screw and the car above the pivot point where the hook end 17 connects to the plate 11.

Removal of the mirror is effected by the reverse of this procedure, leaving only the small unobtrusive plate 11 on the vehicle. Generally, therefore, the mirror will be taken off the car whenever the trailer is removed from the hitch.

According to the modification of FIGURE 7, the mirror assembly is substantially the same with the exception that the hook end 34 of the link 35 faces downwardly instead of upwardly as in the previously described embodiment. This mirror is installed as illustrated in phantom in FIGURE 7, being hooked downwardly through the opening of the plate 11. However, the post 21 must be slid outwardly to permit the necessary downward movement for the hook end while providing sufficient clearance for the inner end of post 21. This construction has the advantage of permitting the bracket 29 to be installed prior to the attachment of the link 34 to the plate 11. In fact, instead of being a separate element as illustrated, the bracket may simply be an upwardly bent piece of the link 35 at its inner end. One of the principal advantages of this type of construction is that it allows factory installation of the bracket for the stop screw 30, which assures that the parts will not be lost upon use.

The foregoing detailed description is to be clearly understood as given by way of illustration and example only, the spirit and scope of this invention being limited solely by the appended claims.

What is claimed is:
1. A vehicle mirror device comprising
a first member,
a mirror at the distal end of said first member,
the opposite end of said first member being adapted to engage a vehicle,
a second member,
said second member at one end engaging said first member
and being divergent away from said first member toward the opposite end of said second member,
said opposite end of said second member including means engageable in a linearly fixed relationship with a vehicle,
and a third means engageable with a vehicle,
said third means being carried by said second member on the side thereof opposite from said first member.
2. A vehicle mirror comprising
a post,
a mirror at one end of said post,
the opposite end of said post being adapted to engage a vehicle,
a support link,
one end of said support link being attached to said post,
a member attachable to a vehicle,
the opposite end of said support link being engageable with said member,
and means extending from said support link adjacent said opposite end
for engagement with said vehicle on the side of said support link remote from said post.
3. A vehicle rear view mirror comprising
a post,
a mirror at one end of said post,
a bumper member at the opposite end of said post for engagement with the side of a vehicle,
a support link,
one end of said support link having a receptacle portion slidably receiving said post,
means for preventing relative sliding movement of said receptacle portion and said post,
said support link diverging away from said post to the opposite end of said support link,
said opposite end of said support link including a hook means,
a member attachable to a vehicle,
said hook means being pivotally engageable with said member for linear retention by said member,
and an adjustable means carried by said support link on the side thereof opposite from said post at said opposite end of said support link,
said adjustable means being engageable with said vehicle for precluding upward rotation of said support link relative to said member attachable to a vehicle.
4. A device as recited in claim 3 in which
said adjustable means includes
a laterally projecting member extending from said opposite end portion of said support link inwardly of said hook,
and a screw threadably received by said laterally projecting member,
one end of said screw being engageable with said side of said vehicle.
5. A device as recited in claim 4 in which
said laterally projecting member includes a substantially L-shaped member,
one leg of said L-shaped member threadably receiving said screw,
and the other leg of said L-shaped member being detachably carried by said support link.
6. A device as recited in claim 5 in which for detachably carrying said other leg,
said support link including a transverse slot therein,
said other leg of said L-shaped member being removably receivable in said transverse slot.
7. A vehicle rear view mirror comprising
a plate attachable to the side of a vehicle,
said plate having an offset portion on one side thereof defining a slot,
a post,
said post having one end adapted to engage the side of a vehicle beneath said plate,
a mirror carried by the opposite end of said post,
a support link,
said support link having a tubular section at one end thereof slidably receiving said post,
set screw means on said tubular section for locking said post within said tubular section,
said support link diverging away from said post to the opposite end of said support link,
said opposite end including a hook portion extending through said slot whereby said plate secures said opposite end of said support link against relative linear movement while permitting rotational movement thereof, a bracket detachably carried by said support link,
    said bracket having a portion extending transversely outward from said support link adjacent but inwardly of said opposite end,
and a screw threadably received by said portion of said bracket,
    said screw having an end adapted to engage the side of a vehicle above said plate for precluding upward rotational movement of said support link and post.

8. A device as recited in claim 7 in which said hook of said support link has an open side upwardly adjacent said bracket.

9. A device as recited in claim 7 in which for detachably carrying said bracket
    said support link includes a laterally offset portion defining a slot,
    and said bracket has a base portion insertable into said slot for retention by said offset portion.

References Cited by the Examiner
UNITED STATES PATENTS

| | | | |
|---|---|---|---|
| 2,595,752 | 5/52 | Batts | 248—224 |
| 2,760,746 | 8/56 | Botolfsen | 248—224 |
| 3,081,057 | 3/63 | Farnsworth | 248—226 |
| 3,142,469 | 7/64 | Clemmer | 248—226 |

CLAUDE A. LE ROY, *Primary Examiner.*